US008209091B2

(12) United States Patent
Morichika et al.

(10) Patent No.: US 8,209,091 B2
(45) Date of Patent: Jun. 26, 2012

(54) METHOD OF AND APPARATUS FOR CONTROLLING STEERING OF A VEHICLE

(75) Inventors: Shunji Morichika, Hiroshima (JP); Katsuaki Morita, Hiroshima (JP); Masahiro Yamaguchi, Hiroshima (JP); Mitsuaki Hoshi, Hiroshima-ken (JP); Kousuke Katahira, Kawasaki (JP)

(73) Assignee: Mitsubishi Heavy Industries, Ltd., Tokyo (JP)

( * ) Notice: Subject to any disclaimer, the term of this patent is extended or adjusted under 35 U.S.C. 154(b) by 447 days.

(21) Appl. No.: 12/516,243

(22) PCT Filed: Jan. 21, 2008

(86) PCT No.: PCT/JP2008/051138
§ 371 (c)(1),
(2), (4) Date: Jun. 18, 2009

(87) PCT Pub. No.: WO2009/011142
PCT Pub. Date: Jan. 22, 2009

(65) Prior Publication Data
US 2010/0100267 A1 Apr. 22, 2010

(30) Foreign Application Priority Data
Jul. 19, 2007 (JP) ................................. 2007-188680

(51) Int. Cl.
*A01B 69/00* (2006.01)
(52) U.S. Cl. .......................................................... 701/41
(58) Field of Classification Search .................... 701/19, 701/23, 41, 43, 70, 92, 32.3, 32.5, 33.3, 33.4
See application file for complete search history.

(56) References Cited

U.S. PATENT DOCUMENTS

| 6,185,492 | B1 | 2/2001 | Kagawa et al. |
| 2005/0182539 | A1* | 8/2005 | Maass ............................ 701/41 |
| 2006/0200280 | A1 | 9/2006 | Kono et al. |
| 2006/0217867 | A1 | 9/2006 | Ono et al. |

FOREIGN PATENT DOCUMENTS

EP 1564614 A1 8/2005
(Continued)

OTHER PUBLICATIONS

SG Search Report for 200903565-0 dated Mar. 5, 2010.
(Continued)

*Primary Examiner* — Kim T Nguyen
(74) *Attorney, Agent, or Firm* — Kanesaka Berner & Partners (57) ABSTRACT

According to a steering control method, before starting, a pattern steering angle table on which pattern steering angles for the front and rear wheels at respective change points of the track are listed is prepared in view of a track condition, etc. from a departure point to a destination point, a vehicle is steered in accordance with a pattern steering angle read from the table, a track widthwise position of the vehicle on running is detected so as to calculate correcting steering angles by which the track widthwise position of the vehicle coincides with a desired position, and the correcting steering angles are added to pattern steering angles so as to obtain desired steering angles by which the front wheels are steered. The pattern steering angle, the corrected steering angle and the desired steering angle are calculated for each of the front and rear wheels, independent from each other.

11 Claims, 7 Drawing Sheets

FOREIGN PATENT DOCUMENTS

| | | |
|---|---|---|
| JP | 63314624 A | 12/1988 |
| JP | 3231071 A | 10/1991 |
| JP | 3269706 A | 12/1991 |
| JP | 5-8613 A | 1/1993 |
| JP | 058613 U | 2/1993 |
| JP | 2001-243033 A | 9/2001 |
| JP | 2001243033 A | 9/2001 |
| JP | 2002268745 A | 9/2002 |
| JP | 2005059695 A | 3/2005 |
| JP | 2005202478 A | 7/2005 |
| JP | 2006008009 A | 1/2006 |
| JP | 2006-264561 A | 10/2006 |
| JP | 2006282067 A | 10/2006 |
| JP | 2006-306334 A | 11/2006 |
| JP | 2006306334 A | 11/2006 |
| JP | 2007001475 A | 1/2007 |

OTHER PUBLICATIONS

ISR for PCT/JP2008/051138 mailed Apr. 22, 2008.
Taiwanese Office Action for 097102544 dated Jan. 31, 2012.

* cited by examiner

Pattern steering angle table (Example)

| No. | Pattern steering angle |
|---|---|
| 1 | 0 |
| 2 | 0 |
| 3 | $\alpha$ |
| 4 | $\alpha$ |
| 5 | 0 |
| 6 | 0 |
| 7 | $\beta$ |
| 8 | $\beta$ |
| 9 | 0 |
| 10 | 0 |

METHOD OF AND APPARATUS FOR CONTROLLING STEERING OF A VEHICLE

RELATED APPLICATIONS

The present application is based on International Application Number PCT/JP0208/051138 filed Jan. 21, 2008, and claims priority from Japanese Application Number 2007-188680, filed Jul. 19, 2007, the disclosures of which are hereby incorporated by reference herein in their entirety.

TECHNICAL FIELD

The present invention relates to a method of and an apparatus for controlling steering of a vehicle which runs on a predetermined track under automatic steering control by means of a steering mechanism incorporating actuators for steering front wheels and rear wheels in order to prevent the wheels from coming off from the track. That is, the present invention can carry out fine steering control in combination of feed-forward control for steering a vehicle being based upon, for example, a course along which the vehicle should run, and which have been computed or stored in memory, and feed-back control for steering the vehicle along, for example, a guide path, being bases upon signals from the guide path side.

BACKGROUND ART

Conventionally, a new transportation system in which a vehicle runs on a predetermined track by rotating rubber tire wheels carrying the vehicle body, incorporates, in general, a steering unit for turning the rubber tire wheels serving as running wheels along a predetermined track, different from a rail way vehicle which runs on a railway.

Patent Document 1 (Japanese Utility Model Laid-Open No. 05-8613) discloses a steering unit of the above-mentioned kind in which values of magnetic fields produced from a guide cable laid along a guide path are detected by a pair of left and right magnetic sensors incorporated in a running vehicle so as to compute a value of deviation of the running vehicle from output values therefrom in order to steer the vehicle in a direction in which the value of deviation is decreased, thereby to run the vehicle along the guide path.

However, the steering control with the use of such feed-back control that a value of deviation of a vehicle with respect to the guide cable is computed so as to steer the wheels in a direction in which the value of deviation is decreased, cannot follow up, by itself alone, high speed running at a high speed up to a maximum speed of 80 Km as in the new transportation system, and accordingly, there would be caused a risk incapable of carrying out such fine steering control that the positions of the centers of the axles of the front and rear wheels can follow one and the same locus, that is, a running locus can be set within a predetermined range of left and right displacements.

Further, Patent Document 2 (Japanese Patent Laid-Open No. 2001-243033) discloses a steering control unit for a vehicle, which carries out steering control for a running vehicle without using a desired control value based upon a predetermined course configuration. This steering control unit detects magnetic markers arranged on a course while detecting a running distance of the vehicle, and a position of the vehicle from a GPS or a track-and-vehicle intercommunication or the like, so as to estimate a course along which the vehicle should travel in view of the position of a detected marker position, thereby to carry out the steering control being based upon the thus estimated course.

However, the course estimating means should carry out complicated computation with a long computation time while a curse should be estimated at several positions, there would be caused such a problem that a response speed under control delays. Further, since only the front wheels are steered, such fine control that the positions of the centers of the front and rear wheel axles can substantially follow up one and the seam locus cannot be carried out. Further, the steering control is based upon an equation of vehicle motion in view of a yaw angle. Thus, although the stability can be enhanced, no fine control for allowing the positions of the centers of the front and rear wheel axles to substantially follow one and the same locus would be able to be made even in the case of four wheel steering since both control for the front wheels and control for the rear wheels influence upon each other.

Further, since the discrete detection of track-widthwise positions from the magnetic markers causes acquirement of terms for updating a control instruction value to be discrete, there would be caused such a risk incapable of carrying out fine control for allowing the positions of the front and rear wheel axles to substantially follow up one and the same locus. Should the fine control for allowing the positions of the centers of the front and rear wheel axles to substantially follow up one and the same locus be impossible, the drive comfortability would be deteriorated, and as a result, it is required to increase the width of the track. Thus, there would be caused a problem of increasing construction costs.

The applicant has been previously proposed a track type transportation system for vehicles, in which a vehicle runs on a predetermined track, incorporating a steering unit for automatically steering the front and rear wheels of the vehicle by means of actuators, and a fail-safe mechanism for preventing the vehicle from coming off from the track even though the automatic steering system becomes malfunctioning (refer to Patent Document, Japanese Patent Laid-Open No. 2006-306334). Explanation will be hereinbelow made of the track type transportation system disclosed in the Patent Document 3 with reference to FIGS. 7, 8*a* and 8*b*.

Figure 7:
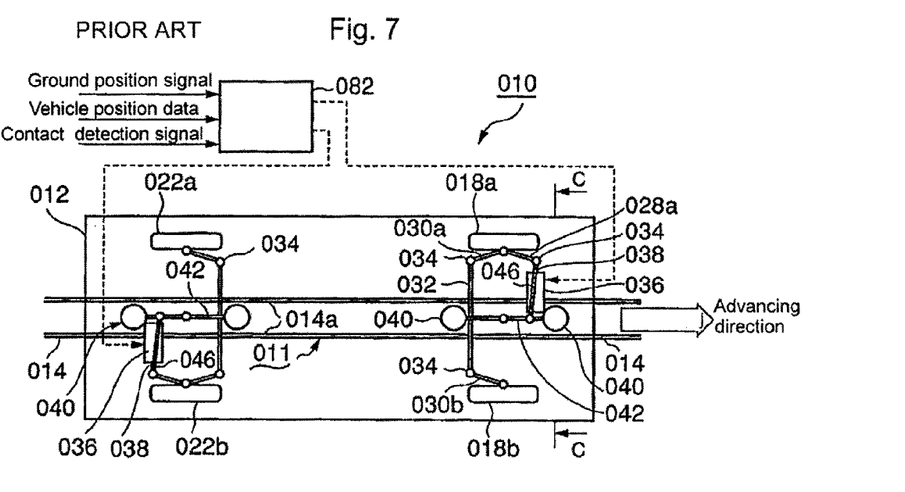
FIG. 7 is a plan view for explaining an automatic steering control mechanism in a conventional track type transportation system.
Figure 8:
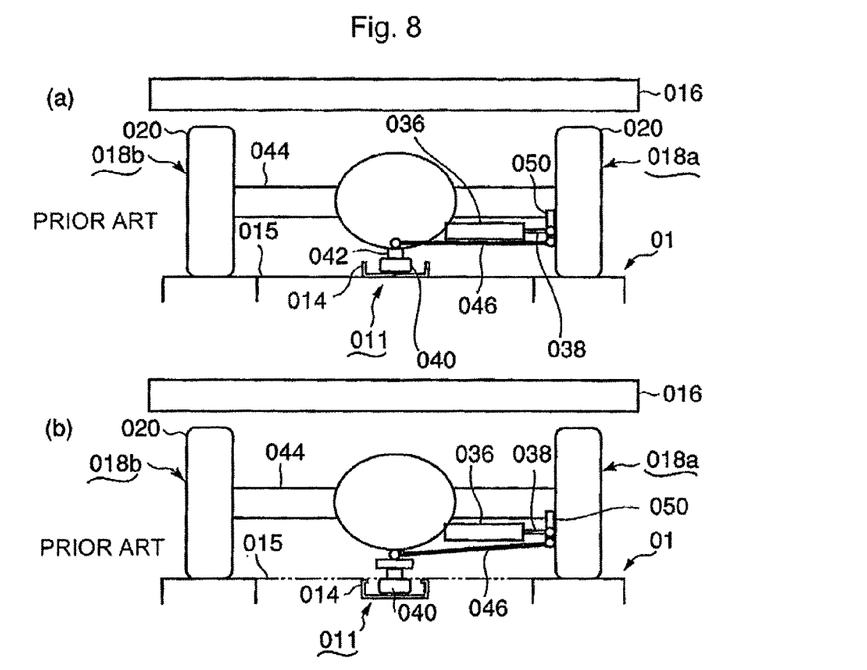

As shown in FIGS. 7, 8*a* and 8*b*, the vehicle 012 incorporating the track type transportation system 010 runs along a track 01 which includes a U-like sectional shape protecting track 014 laid at a substantially center of the track 01 and having a channel-like shape with respect to a road surface 015. The U-like sectional shape protecting track 014 is formed by laying a U-like channel steel.

A front wheel bogie 016 and a rear wheel bogie (which is not shown) for carrying the vehicle 012 are provided underneath the vehicle, respectively in the front and rear parts of the vehicle 012. The front wheel bogies 016 is mounted thereto with an axle 044 for front wheels 018, which is therefore pivotable left and right. The front wheels 18 are mounted thereon with core type tires 020. The rear wheel bogie is also mounted thereto with an axle for rear wheels 022 which is not shown and which is pivotable, left and right. The rear wheels 022 are also mounted thereon with core type rubber tires 020, similar to the front wheels 018.

Next, explanation will be made of the steering unit, focusing on the front wheels 018 side. It is noted the configuration on the rear wheels 022 side is similar to that on the front wheel 018 side.

As shown in FIGS. 7, 8*a* and 8*b*, there are provided a front steering arm 028*a* coupled to a front left wheel 018*b* and extending forward, and a rear steering arm 030*a* extending rearward. Further, there is provided a rear steering 030*b* extending rearward and connected to a front right wheel 018*a*. A tie rod 032 is laid between the rear end parts of the steering arms 030*a*, 030*b* for the rear wheels, that is, the steering arms 030*a*, 030*b* and the tie rod 032 are rotatably coupled to each other by means of spherical joints 034.

Further, a movable rod 038 from an actuator 036 is rotatably coupled at its one end part to the front end part of the front steering arm 028*a* by means of a spherical joint 034. The above-mentioned actuator 036 is mounted to the front wheel bogie 016. The actuator 036 may be composed of, for example, a motor and a ball screw mechanism as a specific structure. However, there may be used any means for carrying out translational motion, such as a pneumatic or hydraulic servo cylinder or a linear motor as the actuator.

It is noted that the tie rod 032 and the rear steering arms 030*a*, 030*b* constitute the so-called Ackermann-Jeantaud type link mechanism for appropriately controlling a turn angle of the left and right wheels during turning, and further, the left wheel 018 and the light wheel 018*a* are linked together by the tie rod 032 so as to surely steer the left and right wheels.

Next, explanation will be made of the fail-safe mechanism. The fail safe mechanism 011 is composed of a protection arm 042 mounted thereto with protection wheels 040, and a protection track 014. The protection wheels 042 are cylindrical and are rotatably supported to the lower surface side of the protection arm 042 in the front and rear end parts thereof. Further, the protection wheels 040 are inserted in the U-like protection track 014, and are arranged so that their peripheral surfaces are faced to the left and right walls 014*a* of the protection track 014. The protection wheels 040 are desirably made of urethane rubber which is highly vibration-resistant and wear-resistant, a material using a steel belt which is used, for example, for a rubber tire, or the like.

Further, the gap between the protection wheel 040 and each side wall 014*a* of the protection track 014 is smaller than an allowable range in which the vehicle 012 should not be turned left and right further more, and accordingly, the protection wheels 040 do not make contact with the left and right side walls 014*a* as far as the steering mechanism is normal. The gap between the protecting wheel 040 and the protection track 014 is set in general in a range from 80 to 100 mm.

The protection arm 042 is extended in the longitudinal direction of the vehicle with the center part thereof being rotatably supported to the lower part of the axle 044 of the front wheels 018.

It is noted that the protection wheels has such a height that it may be located above the road surface 015 as shown in FIG. 8*a* but it may be located below the road surface 015 as shown in FIG. 8*b*. Thus, there can be selected a structure which can be adapted for the existing running track in view of a replacement specification, that is, more flexible adaptation can be made.

The protection arm 042 is coupled in the vicinity of one end part thereof to the front end part of the front steering arm 028*a* through the intermediary of a link rod 046. The link rod 046 and the protecting arm 042 are configured so as to direct the protecting wheels 040 in the same direction as the steered direction of the front wheels 018.

The steering mechanism is composed of the actuator 036, the movable rod 038, the front steering am 028*a* and the rear steering arms 030*a*, 030*b*, and the link mechanism is composed of the protection arm 042 and the link rod 046.

Further, the front steering arm 028*a* is provided in its front end part with a double spherical joint 050 with which one end part of the movable rod 038 of the actuator 036 is coupled to the front end part of the front steering arm 028*a* in such a condition that they are overlapped one upon another with each other. With the use of the above-mentioned double spherical joint 050, it is possible to effectively use a space.

In the steering mechanism having the above-mentioned configuration, on the basis of a ground position signal (ground position data) and vehicle position data, which are inputted to a control means 082 shown in FIG. 7, the control means 082 delivers a steering instruction signal. Thus, the actuator 036 is operated in response to the steering instruction signal, and accordingly, the actuator 036 applies a steering force to the front left wheel 018*b* so as to transmit the steering force from the front steering arm 028*a* to the rear steering arm 030*a*, and then to the front right wheel 018 by way of the tie rod 032.

Further, the steering force from the actuator 036 is also transmitted from the double spherical joint 050 to the protecting arm 042 by way of the link rod 046, and accordingly, the protection wheels 040 are also moved in association with the motion of the actuator 036 so as to be directed in the same direction as that of the front wheels 018. Thus, the protection wheels 040 are moved together with the running vehicle without making contact with the side walls 014*a* of the protecting track 014.

When the steering mechanism is malfunctioning, the protecting wheels 040 make contact with the side walls 014*a* of the protecting track 014. Thereafter, the steering by the actuator 036 is released so as to make the automatic steering mechanism free, and accordingly, the front wheels 018 can be turned in response to the motion of the protection arm 042 along the side walls of the protecting track 014 in order to steer the vehicle 012.

With the configuration of the above-mentioned fail-safe mechanism 011, the vehicle can be safely protected so as to surely transport the passengers even though the automatic steering mechanism fails and so forth, thereby it is possible to ensure a safety and a reliability.

In the steering system disclosed in the Patent Document 3, the front and rear wheels of the vehicle are automatically steered by means of the actuators in order to guide the vehicle so that the vehicle can follow up a desired running locus. However, there would be possibly caused such a problem that the vehicle deviates from a desired locus (specifically, the line connecting between the centers of the axles of the respective front and rear bogies of the vehicle), being caused by disturbance (an initial positional deviation, an inferior running track surface, a shift of the gravitational center of the vehicle, vibration during running, a crosswind, a tire internal pressure, a road surface condition cause by a rain fall).

Thus, in order to precisely determine whether the vehicle follows up a desired running locus or not, it is required to precisely measure a deviated value widthwise of the track.

DISCLOSURE OF THE INVENTION

The present invention has been devised in view of the above-mentioned problems inherent to the conventional technology, and accordingly, one object of the present invention is to provide an automatic steering mechanism for a track type transportation system as stated above, in combination of the above-mentioned feed-back control and feed-forward control, with which a vehicle can run in both forward and rearward movements, and which can carry out such steering control that the positions of the centers of the axles of the running front and rear wheels can substantially follow up one and the same locus during forward or backward movement of the vehicle.

In order to achieve the above-mentioned object, according to the present invention, there is provided a steering control method for a vehicle, in which the front and rear wheels of a vehicle are automatically steered by means of a steering mechanism incorporating actuators so as to allow the vehicle to run on a predetermined locus, comprising the steps of preparing a pattern steering angle table on which pattern angles for front and rear wheels are listed at respective change point on the track in view of a track condition, a running condition and a vehicle condition, from a departure point to a destination point, so as to steer the vehicle, being based upon a pattern steering angle which is read from the table, at every change point while a running distance from the departure point is detected, and detecting a position of the vehicle, widthwise of the track, and calculating a correcting steering angle by which the position of the vehicle widthwise of the track coincides with a desired position, adding the correcting steering angle to the above-mentioned pattern steering angle so as to calculate a desired steering angle for steering the front and rear wheels in response to the desired steering angle, and calculating the pattern steering angle, the correcting steering angle and the desired steering angle for each of the front and rear wheels, independent therebetween.

Further, according to the present invention, there is provided a steering control apparatus for a vehicle, by which a vehicle runs along a predetermined track, and which incorporate a steering mechanism for automatically steering front and rear wheels of the vehicle by means of actuators, comprising: a start preparation means composed of: a storage means for storing therein a distance from a departure point to a destination point, a track condition, a running condition and a vehicle condition, and a computation means for computing pattern steering angles of front and rear wheels at respective change points on the track, from data stored in the storing means, so as to create a pattern steering angle table and a on-running steering control means including: a means for detecting a track widthwise position of the vehicle, a distance detecting means for detecting a distance from the departure point, a computating means receiving steering angle data from the pattern steering angle table, distant data from the distance detecting means, for calculating a pattern steering angle at an arbitrary running ground point, and also receiving vehicle position data from the vehicle position detecting means, for calculating a correcting steering angle with which the track widthwise position of the vehicle coincide with a desired position, and a control means for controlling the actuators in accordance with the pattern steering angle and the correcting steering angle calculated by the computing means, wherein the on-running control means is provided to each of the front and rear wheels, independent therebetween.

According to the present invention, before starting, the pattern steering angles for the front and rear wheels are calculated at respective change points (a change point from a straight line to a transition curve, further a change point turned into a curve, or vice versa) from the previous known conditions including a track condition (the presence of straight lines and curves, the presence of cants or slopes and the like) from a departure point (for example, each stop station on each track) to a destination point (for example, a next stop station) and a vehicle condition (a wheel base (a distance between center axes of the front and rear wheels), a vehicle weight, vehicle dimensions, tire characteristics and the like), and the pattern steering angle table which exhibits thereon the pattern steering angles at the respective change points is prepared. Further, the vehicle is steered at each change point in accordance with the pattern steering angle at this point.

Next, the track widthwise position of the vehicle on running is detected, then a correcting steering angle with which the track widthwise position of the vehicle coincides with a desired position is calculated, and is then added to the pattern steering angle so as to obtain a desired steering angle, for steering the vehicle in accordance with the desired steering angle, thereby it is possible to precisely run the vehicle on a desired running locus.

According to the present invention, the on-running steering control means are independently provided for the left and rear wheels, respectively, and accordingly, the pattern steering angle, the correcting steering angle and the desired steering angle are calculated for each of the front and rear wheels, independent from each other. Thus, the vehicle can run in both forward and rearward directions, and fine steering control can be made so that the positions of the centers of the front and rear wheel axles can substantially follow up one and the same locus during forward or rearward movement.

The pattern steering angle on a curved track can be computed from a sum of or a difference between a geometric steering angle obtained from a radius of curvature of a curved track and the wheel base of the vehicle, and a slip angle caused by tires affected by a curve passing speed of the vehicle and a cant.

In the method according to the present invention, the distance from the departure point to each of the respective change points on the track is obtained by detecting a number of revolutions of a wheel from the departure point to the change point, and a distance coefficient which exhibits the ratio between a known distance from a departure point to a destination point in the last running block, and a distance obtained from a number of revolutions of a wheel, detected in this running block, is derived in order to correct a distance detection error caused by worn tires.

The known conditions can be classified between fixed conditions including a track condition which have been previously stored in the storage means, and variable conditions including a vehicle weight and a distance coefficient detected a last running block and calculated and confirmed by the computing means. The vehicle weight is the sum of a dry weight of a vehicle and the total weight of the passengers, and is confirmed before the starting at the departure point, and is thereafter (for example, after doors of the vehicle are closed) detected from an air suspension (AS) pressure value which is monitored for notch control or the like.

The distance coefficient is the one with which detected pulses from a distance pulse sensor is converted into an actual distance. That is, it exhibit a ratio between a known distance between a departure point to a destination point in the last running block and the distance in this running block, which is obtained by converting a pulse number delivered from the distance pulse sensor and counted in this running block. Thus, by multiplying a pulse number detected by the distance pulse sensor in each running block by the distance coefficient, a detection distance error is corrected, thereby it is possible to precisely compute an actual distance of each running block.

According to the present invention, a pattern steering angle along a transition curve between a curved track and a straight track may be calculated by linearly interpolating the angle of the curved track. Thus, the track widthwise position of the vehicle can be controlled not discretely but continuously. Thereby it is possible to carry out continuous fine control so as to allow the positions of the centers of the front and rear wheel axles to substantially follow up one and the same locus.

The correcting steering angle is obtained in such a way that the product of a deviation between a track widthwise position of the vehicle and a desired position and a proportional gain is added to the product of a derivative gain and a time differential of the deviation, and in addition to the above-mentioned configuration, the proportional gain is preferably set so as to be changed depending upon a vehicle speed, the higher the vehicle speed, the smaller the proportional gain. Thus, it is possible restrain the corrected value of the steering angle from becoming excessive when the vehicle speed is high.

The correcting steering angle of the rear wheels is obtained by multiplying the correcting steering angle of the front wheels by a variable coefficient α which may be set to α<1 when the vehicle speed is higher than a reference speed, but is set to α≧1 when the vehicle speed is lower than the reference speed or when the vehicle runs on a curved track (α is preferably changed so as to be stepwise or stepless in dependence upon a curvature of a curved track as the vehicle speed becomes farther away from the reference speed). Thus, the correcting steering angle is set to be small when the vehicle speed is higher, so that the running stability can be ensured while α≧1 is set when the vehicle speed is low or the vehicle runs on the curved track, so that the steering responsiveness can be increased.

In the present invention, there may be preferably provided a vehicle weight detecting means from which detected data is delivered to the computing means in the start preparation means.

Further, in the present invention, the track widthwise position detecting means for the vehicle is mounted on the vehicle, and detects a relative track widthwise position with respect to a ground structure which is arranged along the track in a positional relationship such that a position relative to the track is not changed.

For example, in a track type transportation system incorporating a fail-safe mechanism composed of a protection track laid on the road surface of a track, and protection wheels provided underneath a vehicle so as to travel along the protection track, the track widthwise position detecting means for the vehicle may be mounted in the lower part of the vehicle at a position which is located within the protection track so as to detect track widthwise distances relative to the left and right walls of the protection track in order to detect a track widthwise position of the vehicle.

Thus, with the use of the side walls of the protection track constituting the fail-safe mechanism, as reference positions, by detecting distances from the side walls, the detection of the track widthwise position of the vehicle can be facilitated. For example, by using a noncontact type displacement meter as the detecting means, the accuracy of the detection can be enhanced, and the problem of abrasion can be eliminated.

According to the present invention, since a pattern steering angle table for respective change points of the track, from known conditions before starting of the vehicle has been prepared, the control of the vehicle as to a pattern steering angle on running can be readily made in such a simple way that linear interpolation is carried out with reference to the pattern steering angle table in accordance with an input of a detection signal which exhibits a distance from a departure point. Further, the correcting steering angle at a position can be readily obtained in view of a deviation at the instant position, and can be controlled for the respective front and rear wheel axles, independent from each other. Accordingly, it is not necessary to consider a vehicle motion such as a Yaw angle, and thus, the control can be simple. Thus, the speed of the computation is very high and continuous, thereby it is possible to carry out continuous, fine and highly reliable steering control.

Thus, with the fine control as stated above, the positions of centers of the front and rear wheel axles can follow up one and the same locus (it is settled in a constant displacement range of about ±50 mm), and accordingly, it is not required to increase the width of the track, resulting in enhancement of the drive comfortability.

Further, since the distance coefficient is obtained at any time before starting, it is possible to eliminate a distant detection error caused by a variation in the dynamic load diameter due to worn tires. On the other hand, the degree of wearing of the tire can be measured, and accordingly, a cornering power depending upon the wearing degree can be appropriately set, thereby it is possible to calculate a pattern steering angle with a high degree of accuracy. Further, a time of replacement of tires is notified in accordance with the distance coefficient in order to enhance the efficiency of the maintenance thereof.

Further, since the pattern steering angle is calculated, the gain for calculating the correcting steering angle can be set to a small value in such a range that an overshoot caused by the control does not affect upon the drive comfortability. Further, since the control is independently made for the respective axles, it can be readily applied also for a vehicle coupled to the instant vehicle.

In addition, in the case of applying the present invention in a transportation system incorporating a fail-safe mechanism composed of a protection track and protection wheels, only by detecting a deviation of the track widthwise position of a vehicle body at two positions of the centers of the front and rear wheel axles, the control is made so that the four protection wheels mounted to opposite ends of protection arms attached to the front and rear wheel sides can be eventually prevented from making contact with the protection track. Thus, the control can be readily and smoothly carried out.

BRIEF DESCRIPTION OF THE DRAWINGS

FIG. 8a is a sectional view along line C-C in FIG. 7; and

FIG. 8b is a view for explaining a variant form of the example shown in FIG. 8a.

BEST MODE FOR CARRYING OUT THE INVENTION

Explanation will be hereinbelow made of an embodiment shown in the figures. It is noted that components explained in this embodiment should not be intended to limit the present invention thereto, in view of their dimensions, materials, shapes and relative positions unless otherwise specified.

Figure 1:
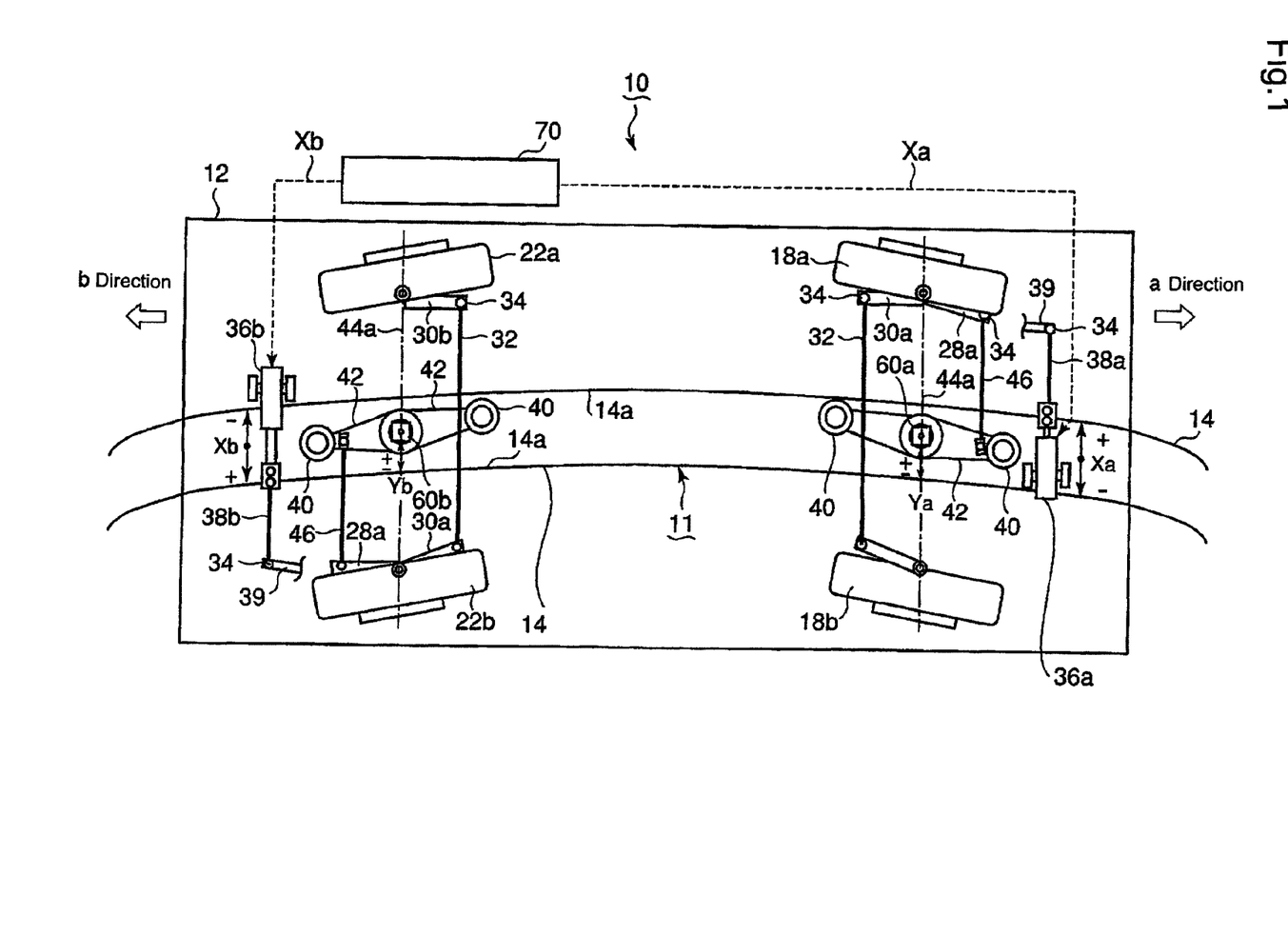
FIG. 1 is a plan view for explaining an embodiment of the present invention.
Figure 2:
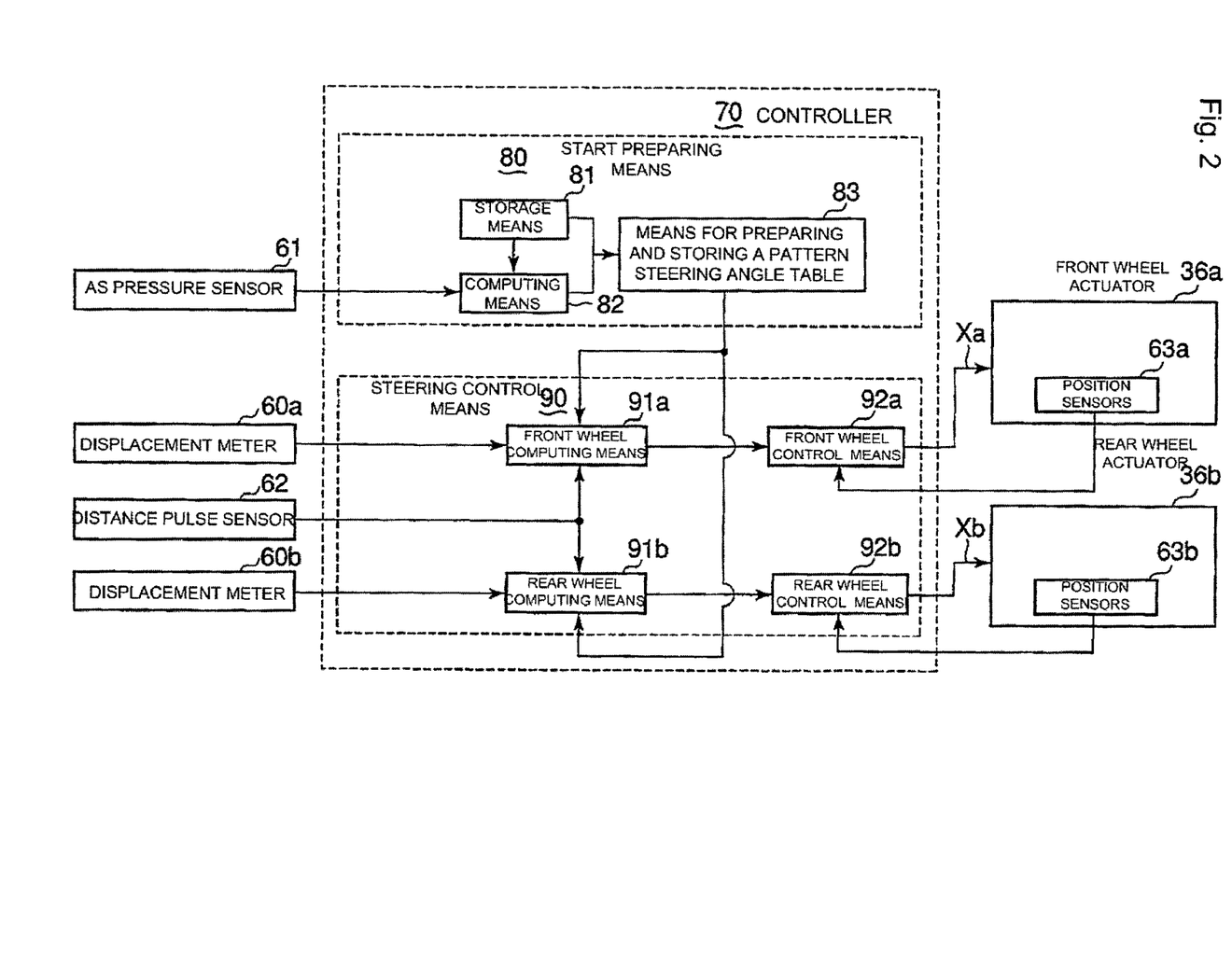
FIG. 2 is a block diagram illustrating a control apparatus in the embodiment.

An embodiment of the present invention will be hereinbelow made with reference to FIGS. 1 to 6. In this embodiment, the present invention is applied to a track type transportation system incorporating a fail-safe mechanism which incorporates a protection track laid on the road surface of a track, and protection wheels provided underneath a vehicle and adapted to move along the protection track. FIG. 1 is a plan view for explanation, which shows a vehicle track as viewed thereabove, and which corresponds to FIG. 7 illustrating the conventional track type transportation system, and FIG. 2 is a block diagram illustrating a control system.

Referring to FIG. 1, like reference numerals are used to denote components like to those shown in FIG. 7 without zero (0) attached to the heads of reference numerals used in FIG. 7, and accordingly, explanation to those components identical to those shown in FIG. 7 will be basically omitted. Referring to FIG. 1, the steering mechanism of the vehicle will be explained as to the front wheel side as an example. A motion of a movable rod 38a of an actuator 36a is transmitted to a front left tire wheel 18b through the intermediary of a spherical joint 34 and a steering arm 39 in order to steer the front left wheel 18b.

The motion of the front left wheel 18b is transmitted to a front right tire wheel 18a which is therefore steered, through the intermediary of a tie rod 32. It is noted that the tie rod 32 and rear steering arms 30a, 30b constitute the so-called Ackermann-Jeantaud type link mechanism for appropriately controlling the steering angle of the left and right wheels during turning.

At the same time, the motion of the front left tire wheel 18b is transmitted to a protection arm 42 through the intermediary of a link rod 46 so that the protection arm 42 is directed in the same steering direction as that of the front wheels 18.

Four protection wheels 40 are mounted to the protection arms 42 on both front and rear wheel sides at opposite ends thereof. The protection wheels 40 are located for running within the protection track 14, and are not made into contact with the left and right side walls 14a of the protection track 14 whenever the automatic steering mechanisms is normally operated, but the protection wheels 40 are made into contact with the left and right side walls 14a of the protection track 14, that is, the protection wheels 40 are engaged with the protection track 14 if the automatic steering mechanism is malfunctioning. Thus, it is possible to prevent the vehicle from coming off from the track. As stated above, the protection track 14 and the protection arms 42 each of which is mounted at the opposite ends thereof with two of the protection wheels 40, constitute the fail-safe mechanism 11.

A controller 70 receives a track condition, a running condition, a vehicle condition, an instant vehicle position computed from a number or revolutions which are detected by a distance pulse sensor 62 (which will be detailed later) from the departure point, and the like, and delivers a steering instruction based upon the above-mentioned data, to the actuator 36. A noncontact type displacement meter 60 is attached underneath the protection arm 42 at the center of the axle line 44a. The noncontact type displacement meter 60 is composed of, for example, a laser type displacement meter or an ultrasonic type displacement sensor. During running of the vehicle 12, distances to the left and right side walls 14 of the track 14 are measured by the noncontact type displacement sensor 60. A deviated value of the vehicle 12 widthwise of the track can be calculated from these detected values.

Next, explanation will be made of the configuration of the steering control mechanism in this embodiment with reference to FIG. 2. In FIG. 2, a storage means 81 which constitutes a start preparing means 80 is stored therein with known conditions including a track condition (the presence of straight lines and curves, and the presence of cants and slopes or the like) from a departure point (stop station) to a destination point (a next stop station), a running condition (a speed pattern and the like), and a vehicle condition (wheel base (a distance between the centers of the front and rear wheel axles), a vehicle weight, dimensions of the vehicle, tire characteristics and the like).

The known conditions are classified into the fixed conditions such as the track condition, which has been beforehand stored in the storage means, and the variable conditions such as the vehicle weight and a distance coefficient, which have been detected in a last running block before the departure and have been determined by the computing means. The vehicle weight is the sum of the dry vehicle weight and the passenger weight, which is detected from a pressure value of an air suspension (AS) monitored for notch control and the like after it is determined before a start at the departure point (for example, after the doors of the vehicle are closed).

The distance coefficient is adapted for converting detection pulses from the distance pulse sensor into an actual distance, that is, it is indicated by a ratio between a known distance from the departure point to the destination point in the last running block, and the distance of this running block into which a number of pulses counted by the distance pulse sensor during the last running is converted. Thus, the actual distance from the departure point can be precisely obtained by multiplying the number of pulses detected from the departure point by the distance coefficient.

Referring to FIG. 2, the pressure value of the air suspension (AS) is measured by an AS pressure sensor 61 at a stop station, and a signal therefrom is transmitted to the computing means 82 which therefore computes pattern steering angles for the front and rear wheels at every a change point of the track, that is, a straight line into a curve or a curve into a straight line, or at every change point reverse thereof, The position of the change point is obtained from a distance from the stop station in the above-mentioned manner. In a means 83 for preparing and storing a pattern steering angle table, a pattern steering angle table on which pattern steering angles are listed up, is prepared and stored. It is noted that the pattern steering angles are prepared for the front and rear wheels, independent from each other.

Figure 3:
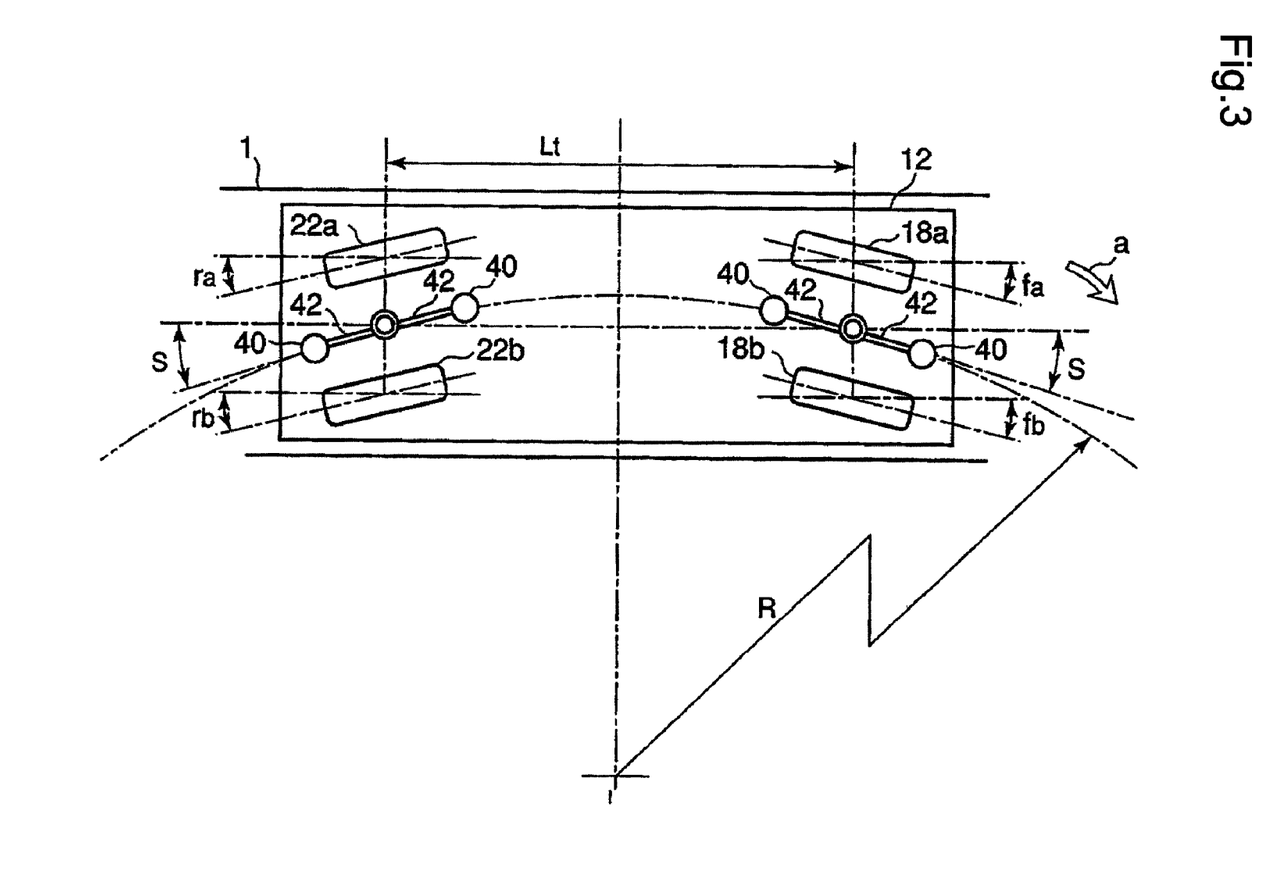
FIG. 3 is a view for explaining a geometrical steering angle in this embodiment.

A pattern steering angle on a curved track is computed by adding a geometrical steering angle obtained from the radius of curvature of the track and the wheel base of the vehicle, to slip angles due to affections of a speed of the vehicle passing through the curved track and a cant. Referring to FIG. 3, as to the vehicle 12 running on the track 1 in the direction of the arrow a, steering angles fa, fb of the front left and right wheels 18a, 18b and steering angles ra, rb of the rear left and right wheels 22a, 22b are computed in consideration with the radius R of curvature, the wheel base (the distance between the centers of the front and rear wheel axles) Lt and slip angles caused at the tires by affections of the speed of the vehicle passing through the curved track and the cant. Thus, the steering angles S of the protection arms 42 are also determined.

Figure 4:
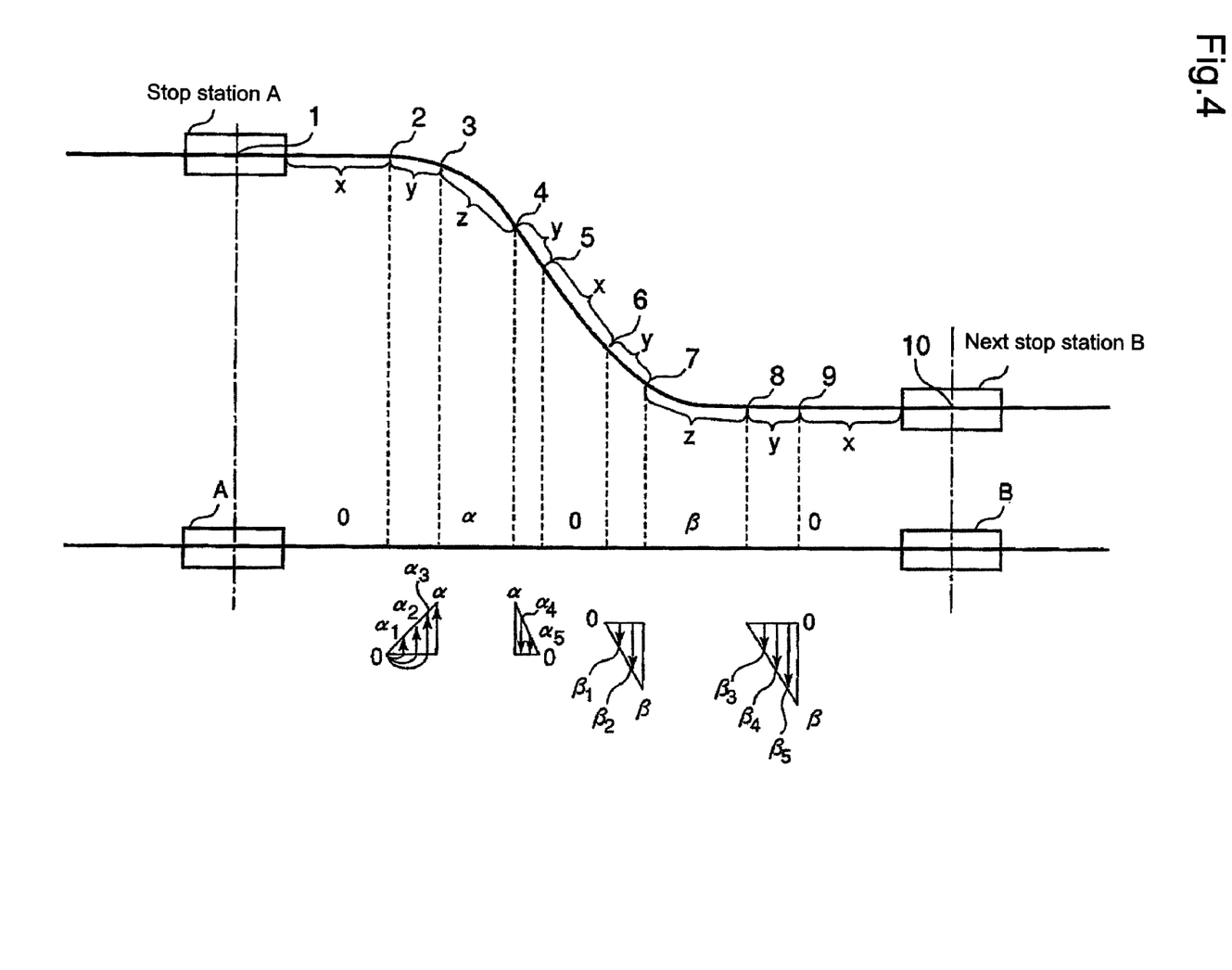
FIG. 4 is a view for explaining a process of calculating the pattern steering angle in this embodiment.

Referring to FIG. 4 which shows a process of calculating the pattern steering angles, among several running blocks 1 to 10 from a stop station A to a next stop station B, x denotes a straight running block while y denotes a running block of a transition from a straight track into a curved track, that is, a transition curve running block where the curvature is gradually changed, and z denotes a curved running block having a constant curvature over this entire block. In the case of running of the vehicle on this track, the pattern steering angle is zero in the straight running block but is α or β in the curved running block z.

Figure 5:
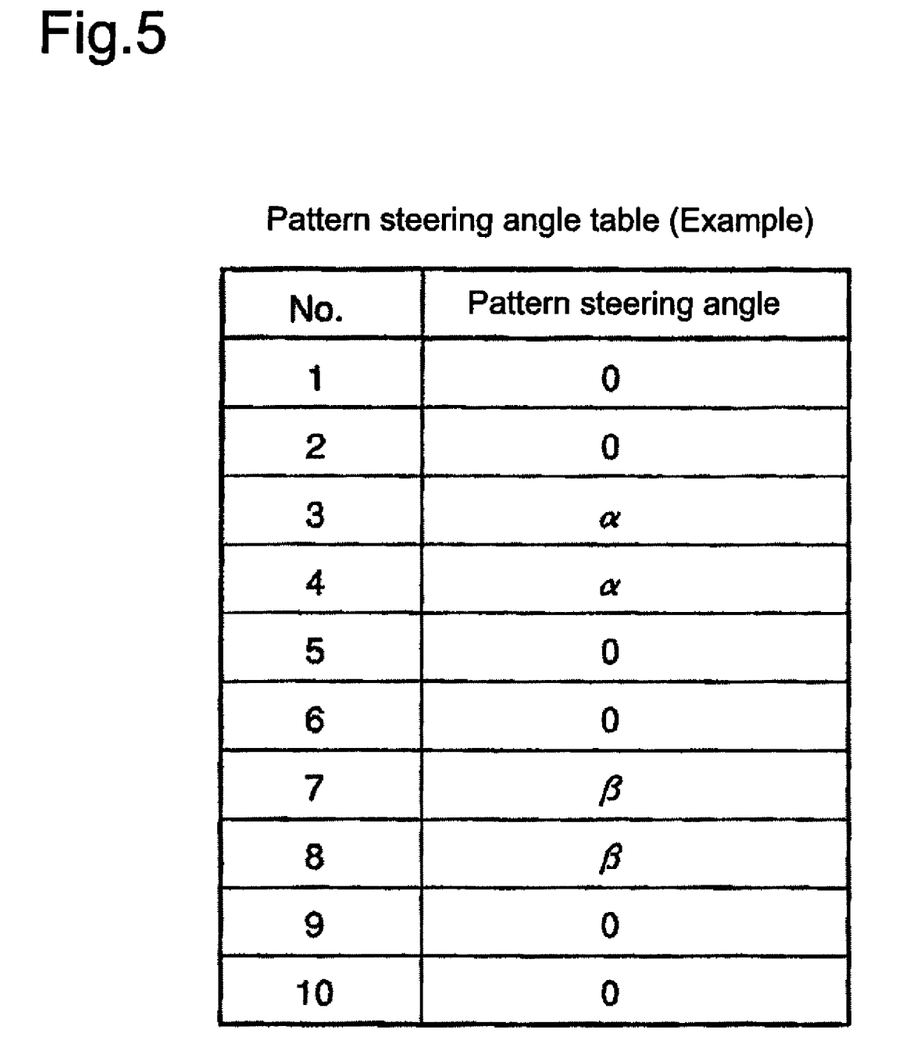
FIG. 5 is a view for showing a pattern steering angle table in the embodiment.

FIG. 5 shows the pattern steering angle table on which pattern steering angles in the running blocks 1 to 19 between the stop station A and the next stop station B shown in FIG. 4 are listed up. It is noted that different steering angles as indicated by α1 to α5 or β1 to β5 are obtained by linear interpolation (proportional interpolation) between zero and α or β.

Thus, the pattern steering angle tables independently prepared respectively for the front and rear wheels, are transmitted respectively to a front wheel computing means 91*a* and a rear wheel computing means 91*b* in an on-running steering control means 90. Further, the front wheel computing means 91*a* receives a deviated position which is a track widthwise position of the vehicle 12 detected by a noncontact type displacement meter 60*a* provided on the front wheel side, and the rear wheel computing means 91*b* receives a deviated position which is a track widthwise position of the vehicle 12 detected by a noncontact type displacement meter 60*b* provided on the rear wheel side.

A number of pulses detected by the distance pulse sensor 62 from the stop station A to the present running position is delivered to both front wheel computing means 91*a* and rear wheel computing means 91*b*.

The front wheel computing means 91*a* and the rear wheel computing means 91*b* compute steering angles from inputted various detection signals, and deliver the thus computed steering angles to a front wheel control means 92*a* and a rear wheel control means 92*b*, respectively. The front wheel control means 92*a* and the rear wheel control means 92*b* deliver steering instructions Xa, Xb computed from the computed steering angles, to the front wheel actuator 36*a* and the rear wheel actuator 36*b*, respectively so as to operate these actuators.

The motions of movable rods 36*a*, 36*b* of the front wheel actuator 36*a* and the rear wheel actuator 36*b* are detected by position sensors 63*a*, 63*b* provided to these actuators so as to carry out feed-back control.

Figure 6:
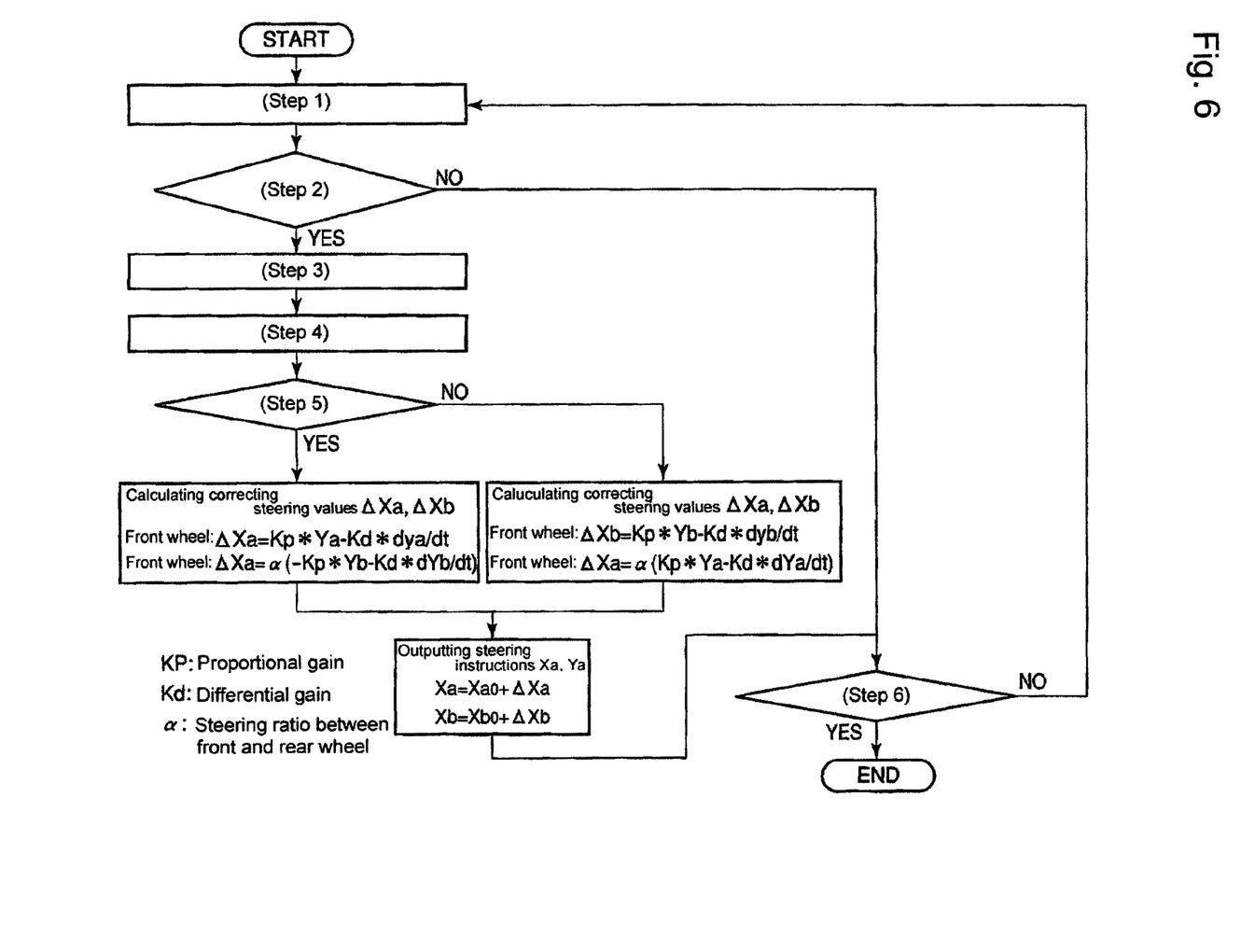
FIG. 6 is a flow-chart for indicating process steps of the steering control in the embodiment.

Next, explanation will be made of process steps of the steering control in this embodiment with reference to FIG. 6. In this case, the vehicle 12 runs in the direction of the arrow a, as an example. Referring to FIG. 6, at first, the present running distance from the departure point (the stop station A) is detected by the distance pulse sensor 62 (step 1). Next, whether the running direction of the vehicle is appropriate or not is determined (step 2). Next, the computing means 82 calculates a front wheel side pattern steering angles Xao and a rear wheel side pattern steering angle Xbo at every change point in the above-mentioned method (step 3).

The vehicle 12 is steered being based upon the pattern steering angles calculated at every change point. Further, on the transition curve track, the linear interpolation is carried out in the manner shown in FIG. 4 so as to calculate pattern steering angles. Thus, the wheels are steered with the thus calculated values.

Next, deviated values Ya, Yb of track widthwise positions of the vehicle 12 are detected on the front wheel axle sides and the rear wheel side by the noncontact type displacement sensors 60*a*, 60*b*, respectively (step 4).

Next, whether the vehicle 12 runs in the direction a or in the direction b is determined (step 5).

Next, a front wheel side correcting steering value ΔXa and the rear wheel side correcting steering value ΔXb are calculated with the use of a formula which depends upon the advancing direction (direction a or b) of the vehicle 12. The deviated values correspond to the relative widthwise differences between the positions of the centers of the axles of the vehicle 12 and desired positions on the track side (the side walls 14*a* of the protection track 14), and accordingly, the product of a proportional gain Kp and the deviated values Ya, Yb is added to the product of a derivative gain Kd and the time differential dYa/dt, dYb/dt of the deviated-values Ya, Yb so as to obtain the correcting steering values. The front wheel correcting steering angle ΔXa, and the rear wheel correcting steering angle ΔXb are calculated, independent from each other.

It is noted that in the formulae for the correcting steering angles, as shown in FIG. 6, the sign of the deviated value is set to minus (−) in a direction in which the protection arm 42 approaches the side wall 14*a* of the protection track but is set to plus (+) in the direction in which it goes away from the side wall 14*a*. Plus (+) is set in the direction in which the movable arms 38*a*, 38*b* of the actuator 36*a*, 36*b* are extended but minus (−) is set in the direction in which the movable arms 38*a*, 38*b* are retracted.

In order to enhance the running stability, the proportional gain Kp is set to be variable, the higher the running speed, the smaller the proportional gain Kp. Further, in order to enhance the running safety, the correcting steering angle for the rear wheels is obtained by multiplying the correcting steering angle for the front wheels by a coefficient α. When the running speed is higher, α<1 is set, but when the running speed is low or when the vehicle runs on a curved track, α≧1 is set.

Thus, in the computing means 91*a*, 91*b*, the pattern steering angles are added thereto with the correcting steering angles so as to calculate desired steering angles, in dependence upon which the control means 92*a*, 92*b* deliver steering instructions Xa, Xb to the respective actuators 36*a*, 36*b* for the front and rear wheels, independent from each other, in order to steer the vehicle 12. The desired steering angles are converted into desired positions of the actuators which are mechanically linked to the running wheels (alternatively, the desired steering angles may be replaced with positional converted values). Thus, the movable rods 38*a*, 38*b* of the actuators are positionally controlled in response to desired position instructions delivered from the controller 70 and feed-back signals from the position sensors 63*a*, 63*b* for the actuators. This steering control is continued until the running of the vehicle 12 is completed (step 6).

According to this embodiment, since the pattern steering angle table from the known conditions has been prepared before the start of the vehicle 12, the pattern steering angle can be obtained through the linear interpolation in accordance with a distance detection signal exhibiting a distance from the departure point with reference to the pattern steering angle table, and accordingly, the control can be simplified. Further, the correcting steering angle can be obtained simply by deriving a correcting steering angle at one position from a deviated value at this position, and the front and rear wheel axles are controlled, independent from each other, thereby it is possible to simplify the control without consideration of vehicle motions such as a yaw angle or the like. The computation can be finely made continuously at a high speed, thereby it is possible to enhance the steering control with a high degree of reliability.

Thus, with the fine control as stated above, the positions of the centers of the front and rear wheel axles can substantially follow up one and the same locus (the widthwise displacement range is settled to about ±50 mm). Thereby it is possible to eliminate the necessity of increasing the track width, and as well to enhance the drive comfortability.

Further, since the distance coefficient is derived at any time before a start of the vehicle, there can be eliminated errors upon distance detection, which is caused by variation in the dynamic load diameter due to worn tires. In other word, the degrees of abrasion of tires can be detected, and accordingly, a cornering power appropriate for the degree of abrasion can be precisely set. Thereby it is possible to calculate the pattern steering angle with a high degree of accuracy. Further, the period of replacement of tires can be set in accordance with the distance coefficient, thereby it is possible to carry out efficient maintenance for the vehicle.

Further, since the pattern steering angle is calculated, the gain for calculating the correcting steering angle can be set to a small value within such a range that an overshoot caused by the control does not affect upon the drive comfortability. Further, since the control is made for the respective axles, independent from each other, the control can be applied to vehicles coupled to each other.

Further, since the displacement meter 60 is composed of a laser type displacement meter or an ultrasonic type displacement meter, the accuracy of detection and the responsiveness can be enhanced with no problem of abrasion.

In addition, since the steering control in this embodiment is applied to the track type transportation system 10 incorporating the fail-safe mechanism composed of the protection track 14 and the protection wheels 40, the widthwise displacement of the vehicle body is detected, at two front and rears positions of the vehicle, that is, the positions of the centers of the front and rear wheels, and as a result, the control is made in such a way that the four protection wheels do not make contact with the protection track 14. As a result, the control can be smoothly made.

INDUSTRIAL APPLICABILITY

According to the present invention, in a new transportation system, the vehicle can run in both forward and backward directions, and such fine control that the positions of the centers of the front and rear wheel axles can substantially follow one and the same locus during forward or backward movement, can be carried out.

The invention claimed is:

1. A steering control method performed by a steering control apparatus for automatically steering a vehicle so as to cause the vehicle to run on a predetermined track, the vehicle incorporating steering mechanisms including actuators by means of which front and rear wheels of the vehicle run on the track, said method comprising the steps of:
preparing a pattern steering angle table on which pattern steering angles for the front and rear wheels are listed for respective change points of the track before starting, in view of a track condition, a running condition and a vehicle condition from a departure point to a destination point in order to steer the vehicle in accordance with the pattern steering angles which are read from the table at every change point while a traveled distance from the departure point is detected,
detecting a track widthwise position of the vehicle on running on the track so as to calculate correcting steering angles with which the track widthwise position of the vehicle coincides with a desired position, and
adding the correcting steering angles to the pattern steering angles so as to calculate desired steering angles in order to steer the front and rear wheels in accordance with the desired steering angles,
wherein the pattern steering angles, the correcting steering angles and the desired steering angles for the front wheels and for the rear wheels are independently calculated from each other.

2. A steering control method as set forth in claim 1, wherein the pattern steering angles in a curved track are computed in view of a geometrical steering angle obtained from a radius of curvature of the track and a space between the front and rear wheels, a speed of the vehicle running on the curved track, and a slip angle produced at a tire and affected by a cant.

3. A steering control method as set forth in claim 1, further comprising the steps of:
obtaining a distance from the departure point to each of the change points of the track based on detected number of revolutions of the wheels from the departure point to the change point, and
deriving a distance coefficient which exhibits a ratio between a known distance from a departure point to a destination point of a last running block and a number of revolutions of the wheels which has been detected in said last running block, in order to correct a distance detection error due to worn wheels.

4. A steering control method as set forth in claim 1, wherein the pattern steering angles along a transition curve between a curved track and a straight track are calculated by linear interpolation of steering angles on the curved track.

5. A steering control method as set forth in claim 1, wherein the correcting steering angles are calculated by adding a product of a deviation between the track widthwise position of the vehicle and the desired position, and a proportional gain to the product of a derivative gain and a time differential of the deviation.

6. A steering control method as set forth in claim 5, wherein the proportional gain is set to be variable in dependence upon a speed of the vehicle, the higher the vehicle speed, the smaller the proportional gain.

7. A steering control method as set forth in claim 1, wherein the correcting steering angle for the rear wheels is obtained by multiplying the correcting steering angle for the front wheel by a variable coefficient α which is set to α<1 when the vehicle speed is high, but is set to α≧1 when the vehicle speed is low or when the vehicle runs on a curved track.

8. A steering control apparatus for a vehicle, including a steering mechanism for automatically steering front and rear wheels of the vehicle by actuators so to cause the vehicle to run on a predetermined track, said steering control apparatus comprising:
a start preparation means including
a storage means for storing therein a distance, a track condition, a running condition and a vehicle condition from a departure point to a destination point, and
a first computing means for computing pattern steering angles for the front and rear wheels at respective change points of the track from data stored in the storage means so as to prepare a pattern steering angle table on which the pattern steering angles for the front and rear wheels at the respective change points are listed,
an on-running steering control means including:
a means for detecting a track widthwise position of the vehicle,
a distance detecting means for detecting a distance from a departure point,
a second computing means for receiving steering angle data on the pattern steering angle table and distance data from the distance detecting means, for calculating a pattern steering angle at an arbitrary running point, and for receiving vehicle position data from the vehicle position detecting means so as to calculate a correcting steering angle with which the track widthwise position of the vehicle coincides with a desired position, and
a control means for controlling the actuators in accordance with the pattern steering angle and the correcting steering angle calculated by the second computing means, wherein the on-running steering control means is provided independently to each of the front and rear wheels.

9. A steering control apparatus as set forth in claim 8, further comprising a vehicle weight detecting means for delivering detection data to the computing means in the start preparation means.

10. A steering control apparatus as set forth in claim 8, wherein the means for detecting track widthwise position is adapted to be mounted on the vehicle to detect a track widthwise relative position with respect to a ground structure which is laid along the track with such a positional relationship that the relative position to the track is not changed.

11. A steering control apparatus as set forth in claim 10, further comprising a fail-safe mechanism that includes
   a protection track laid on the track, and
   protection wheels adapted to be provided underneath the vehicle to travel along the protection track,
wherein the track widthwise position detecting means is adapted to be mounted to a lower portion of the vehicle at a position located in the protection track so as to detect track widthwise distances to left and right walls of the protection track in order to detect a track widthwise position of the vehicle.

* * * * *